United States Patent
Rodrigues et al.

(10) Patent No.: US 10,412,148 B2
(45) Date of Patent: Sep. 10, 2019

(54) SYSTEMS AND METHODS FOR EVENT AGGREGATION TO REDUCE NETWORK BANDWIDTH AND IMPROVE NETWORK AND ACTIVITY FEED SERVER EFFICIENCY

(71) Applicant: Microsoft Technology Licensing, LLC, Redmond, WA (US)

(72) Inventors: André Miguel Coelho de Oliveira Rodrigues, Seattle, WA (US); Ilya Grebnov, Kirkland, WA (US); Sunay Vaishnav, Bellevue, WA (US); Samuel Lenz Banina, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 479 days.

(21) Appl. No.: 15/216,027

(22) Filed: Jul. 21, 2016

(65) Prior Publication Data
US 2018/0027045 A1    Jan. 25, 2018

(51) Int. Cl.
*G06F 15/16*     (2006.01)
*H04L 29/08*     (2006.01)
(Continued)

(52) U.S. Cl.
CPC .............. *H04L 67/02* (2013.01); *G06F 3/14* (2013.01); *G06F 16/2453* (2019.01);
(Continued)

(58) Field of Classification Search
CPC ....... H04L 67/02; H04L 67/18; H04L 67/325; H04L 67/42; G06F 3/14; G06F 17/30442; G06F 17/30551
(Continued)

(56) References Cited

U.S. PATENT DOCUMENTS 7,219,239 B1 *  5/2007  Njemanze ........... H04L 63/0218
                                                     726/21
7,349,913 B2 *  3/2008  Clark ................ G06F 17/30174
(Continued)

FOREIGN PATENT DOCUMENTS

| EP | 2229789 A1 | 9/2010 |
| EP | 2405371 A1 | 1/2012 |
| WO | 2014062610 A1 | 4/2014 |

OTHER PUBLICATIONS

"International Search Report and Written Opinion Issued in PCT Application No. PCT/US2017/040633", dated Sep. 5, 2017, 14 Pages.
(Continued)

*Primary Examiner* — Melvin H Pollack
(74) *Attorney, Agent, or Firm* — Buckley, Maschoff & Talwalkar LLC (57) ABSTRACT

A client device includes a processor and memory. An operating system and a client application are executed by the processor and memory. The client application is configured to determine first and second coordinated universal time (UTC) time intervals for a first non-UTC time interval associated with a first event type and a second non-UTC time interval associated with the first event type; generate a single request for the remote activity feed server to aggregate corresponding events during the first UTC time interval and the second UTC time interval; and send the single request via a network interface to the remote activity feed server.

17 Claims, 6 Drawing Sheets

(51) Int. Cl.
   *G06F 3/14*    (2006.01)
   *H04L 29/06*   (2006.01)
   *G06F 16/2453* (2019.01)
   *G06F 16/2458* (2019.01)

(52) U.S. Cl.
   CPC .......... *G06F 16/2477* (2019.01); *H04L 67/18* (2013.01); *H04L 67/325* (2013.01); *H04L 67/42* (2013.01)

(58) Field of Classification Search
   USPC ........................................................ 709/203
   See application file for complete search history.

(56) References Cited

U.S. PATENT DOCUMENTS

| | | | | |
|---|---|---|---|---|
| 7,434,154 | B2* | 10/2008 | Konetski | H04N 5/76 348/E5.006 |
| 7,568,023 | B2* | 7/2009 | Green | H04L 43/022 709/223 |
| 7,676,288 | B2* | 3/2010 | Middleton, Jr. | G06F 17/30548 345/440 |
| 8,051,162 | B2* | 11/2011 | Arlitt | G06F 11/3452 702/182 |
| 8,112,425 | B2* | 2/2012 | Baum | G06F 17/30551 707/746 |
| 8,260,736 | B1* | 9/2012 | Lear | G06N 5/02 706/46 |
| 8,365,278 | B1 | 1/2013 | Njemanze et al. | |
| 8,849,183 | B2 | 9/2014 | Edge et al. | |
| 8,903,954 | B2* | 12/2014 | Luna | H04L 67/04 709/203 |
| 9,154,365 | B1 | 10/2015 | Henry | |
| 9,306,929 | B2* | 4/2016 | Jimenez Arreola | H04L 63/08 |
| 9,313,560 | B2* | 4/2016 | Bae | H04Q 9/00 |
| 9,372,900 | B2* | 6/2016 | Pinto Filipe | G06F 17/30306 |
| 9,413,852 | B2* | 8/2016 | Lawson | G05B 19/4185 |
| 9,569,253 | B1* | 2/2017 | Hsieh | G06F 9/466 |
| 9,578,046 | B2* | 2/2017 | Baker | H04L 63/1416 |
| 9,753,909 | B2* | 9/2017 | Miller | G06F 17/243 |
| 9,760,240 | B2* | 9/2017 | Maheshwari | G06F 17/30548 |
| 9,858,322 | B2* | 1/2018 | Theimer | G06F 17/30563 |
| 9,876,693 | B1* | 1/2018 | Davidson | H04L 43/08 |
| 9,892,172 | B2* | 2/2018 | Dwan | G06F 17/30551 |
| 9,892,178 | B2* | 2/2018 | Schuster | G06F 17/30563 |
| 2003/0200192 | A1 | 10/2003 | Bell et al. | |
| 2006/0136549 | A1* | 6/2006 | Carro | H04H 60/40 709/203 |
| 2008/0114749 | A1 | 5/2008 | Chandhok et al. | |
| 2008/0126408 | A1 | 5/2008 | Middleton | |
| 2009/0083372 | A1* | 3/2009 | Teppler | H04L 9/3226 709/203 |
| 2010/0145947 | A1* | 6/2010 | Kolman | G06F 17/3087 707/736 |
| 2011/0302153 | A1 | 12/2011 | Meretakis et al. | |
| 2014/0046645 | A1* | 2/2014 | White | G06F 17/509 703/13 |
| 2014/0280200 | A1 | 9/2014 | Dwan | |
| 2015/0032775 | A1* | 1/2015 | Yang | G06F 17/30551 707/770 |
| 2015/0032801 | A1* | 1/2015 | Hart | H04W 4/12 709/203 |
| 2015/0153374 | A1* | 6/2015 | Balakrishnan | G01P 13/00 702/178 |
| 2015/0331856 | A1 | 11/2015 | Choi et al. | |
| 2016/0027037 | A1 | 1/2016 | Cai et al. | |
| 2016/0103424 | A1* | 4/2016 | Shin | G04G 7/00 368/29 |
| 2016/0147830 | A1* | 5/2016 | Zhong | G06F 17/30085 707/769 |
| 2016/0342955 | A1* | 11/2016 | Brock | H04L 67/02 |
| 2016/0344800 | A1* | 11/2016 | Emmanuel | H04L 67/10 |
| 2016/0363911 | A1* | 12/2016 | Belitsky | G04G 9/0076 |
| 2017/0083572 | A1* | 3/2017 | Tankersley | G06F 17/30439 |
| 2018/0191807 | A1* | 7/2018 | Dawes | H04L 41/22 |

OTHER PUBLICATIONS

"Aggregation Granularity", Retrieved on: May 20, 2016, Available at: http://druid.io/docs/latest/querying/granularities.html.

Pandey, et al., "Distributed Event Aggregation for Content-based Publish/Subscribe Systems", In Proceedings of the 8th ACM International Conference on Distributed Event-Based Systems, May 26, 2014, 12 pages.

"How to organize time-based events for aggregation (such as visits) in a database?", Retrieved on: May 20, 2016, Available at: http://stackoverflow.com/questions/3848880/how-to-organize-time-based-events-for-aggregation-such-as-visits-in-a-database.

* cited by examiner

SYSTEMS AND METHODS FOR EVENT AGGREGATION TO REDUCE NETWORK BANDWIDTH AND IMPROVE NETWORK AND ACTIVITY FEED SERVER EFFICIENCY

FIELD

The present disclosure relates to computer systems, and more particularly to systems and methods for event aggregation to reduce network bandwidth and improve network and activity feed server efficiency.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Client applications that are executed by client devices such as desktop computers, tablets, mobile devices such as smartphones, etc. may interact with a remote activity feed server over a distributed communications system. The client applications typically communicate with the remote activity feed server by generating hypertext transfer protocol (HTTP) requests. The remote activity feed server receives the HTTP requests and generates HTTP responses including information relating to the HTTP requests.

The remote activity feed server tracks occurrences of various types of events for client devices in an event database. The client applications periodically request information from the activity feed server relating to the events and the number of occurrences in a given time interval. The activity feed server receives the HTTP request, converts the local time interval for the client device into coordinated universal time (UTC) time (using a time zone format sent by the client device), reads an event database to identify the occurrence of events having the event type corresponding to the request and the UTC time interval, and generates a response including a count of the events and other related information.

Since the activity feed server usually services a large number of client devices, the process for generating event aggregations should be as efficient as possible to reduce implementation cost and latency. Furthermore, the network traffic generated by the requests from the client devices and the responses from the activity feed servers should be made in an efficient manner as possible to reduce network bandwidth.

SUMMARY

A client device includes a processor and memory. An operating system is executed by the processor and memory. A client application is executed by the processor and memory and is configured to determine first and second coordinated universal time (UTC) time intervals for a first non-UTC time interval associated with a first event type and a second non-UTC time interval associated with the first event type; generate a single request for the remote server to aggregate corresponding events during the first UTC time interval and the second UTC time interval; and send the single request via a network interface to the remote server.

In other features, the client application is further configured to receive a single response from the remote server corresponding to the single request. The client application generates the single request using hypertext transfer protocol. The client application determines the first UTC time interval and the second UTC time interval by sending a request to the operating system of the client device including the first non-UTC time interval of the first event type and the second non-UTC time interval of the first event type; and receiving a response from the operating system of the client device.

In other features, the first non-UTC time interval corresponds to a relative time period that is dependent upon a geographic location of the client device. The client application interprets the single response and updates an event summary screen of the client application based thereon. The client application interprets the single response and updates an event summary screen of the client application by updating a first count corresponding to the first non-UTC time interval of the first event type and updating a second count corresponding to the second non-UTC time interval of the first event type.

In other features, the first non-UTC time interval overlaps the second non-UTC time interval. The first non-UTC time interval has a different duration than the second non-UTC time interval. The first non-UTC time interval does not overlap the second non-UTC time interval. The first non-UTC time interval has the same duration as the second non-UTC time interval.

A server includes a processor and memory, a network interface and an event database. An activity feed application is executed by the processor and memory and is configured to receive a single request from a client device via the network interface. The single request includes a first coordinated universal time (UTC) time interval associated with a first event type and a second UTC time interval associated with the first event type. The activity feed application is further configured to aggregate corresponding events of the first event type in the event database for the client device during the first UTC interval and the second UTC interval; and generate a single response to the client device.

In other features, the server is further configured to transmit the single response to the client device via the network interface. The activity feed application generates the single request using hypertext transfer protocol.

A server includes a processor and memory, a network interface, and an event database. An activity feed application is executed by the processor and memory and is configured to pre-aggregate events for a plurality of client devices by event type during time windows to generate pre-aggregated event counts; receive a single request from one of the client devices via the network interface including a first coordinated universal time (UTC) time interval associated with a first event type and a second UTC time interval associated with the first event type; generate a first count and a second count by aggregating corresponding pre-aggregated event counts during the first UTC interval for the first event type and the second UTC interval for the first event type, respectively; and generate a single response for the client device including the first count and the second count.

In other features, the server is further configured to transmit the single response to the client device via the network interface. The activity feed application generates the single request in hypertext transfer protocol.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Systems and methods according to the present disclosure reduce network bandwidth and activity feed server processing burden by improving the process for generating event aggregations for multiple time intervals. Prior to sending a request to the activity feed server, the client device according to the present disclosure converts desired local time intervals for event aggregations into UTC time intervals. As can be appreciated, the client device knows its location and is better suited to convert the local time intervals into UTC time intervals.

Oftentimes, the client applications include event summary screens for displaying event aggregations for two or more different time intervals. The client device according to the present disclosure generates a single request for aggregations of events during two or more UTC time intervals and sends the single request to the activity feed server. The UTC time intervals can have the same or different durations and can be overlapping or non-overlapping time intervals.

The activity feed server receives the single request from the client device, reads events corresponding to the event type, the UTC time intervals and the client device in an event database. The activity feed server aggregates or sums the events for the UTC time intervals. In some examples, the activity feed server pre-aggregates the events that occur during successive UTC time windows. For example, the successive UTC time windows may be 30 minute windows and/or other durations to reduce the number of read operations that the activity feed server needs to make when receiving the request. The activity feed server sends a single response back to the client device that includes counts for the UTC time intervals along with other information.

As can be appreciated, relative time windows such as today, yesterday, last week, etc. depend upon the local time where the client device is currently located. Therefore, as the client device moves from one location to another, the meaning of the relative time interval changes. For example, the meaning of today for a client device located in London is different that the meaning of today for a client device located in New York.

In addition, a time interval corresponding to yesterday for two different client devices may have different durations and may correspond to different UTC start and stop times. For example, a first client device is located in a region where daylight savings time is recognized while a second client device is located in a region where daylight savings time is not recognized. On the day when the daylight savings transition occurs, the first device may request aggregation of events during the day, which is 23 or 25 hours long from the perspective of the first client device. The second client device may request aggregation of events during the same day, which is 24 hours long from the perspective of the second client device.

As can be appreciated, converting the time intervals into UTC time intervals at the activity feed server requires complex programming and knowledge of the location of the client device. This would also make it harder for the client device to specify time intervals during which the above mentioned time changes may happen (e.g. daylight savings). Performing the conversion at the activity feed server increases latency. To reduce server latency, the client devices according to the present disclosure convert the desire local time intervals into UTC time intervals prior to sending the requests to the activity feed server. As a result, server latency and programming complexity is reduced.

Additionally, the client applications may require event aggregation for multiple UTC time periods. Rather than sending a request for each time interval, the client application sends a single request for multiple UTC time intervals, which reduces network bandwidth in both directions.

Figure 1:
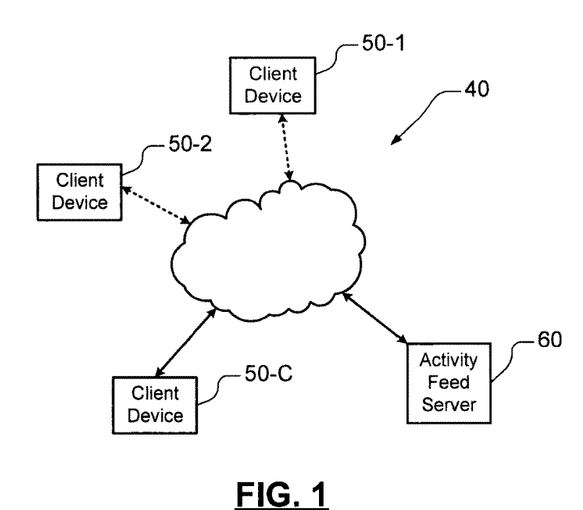
FIG. 1 is a functional block diagram of an example of network including a distributed communications system, multiple client devices and an activity feed server.
Figure 2:
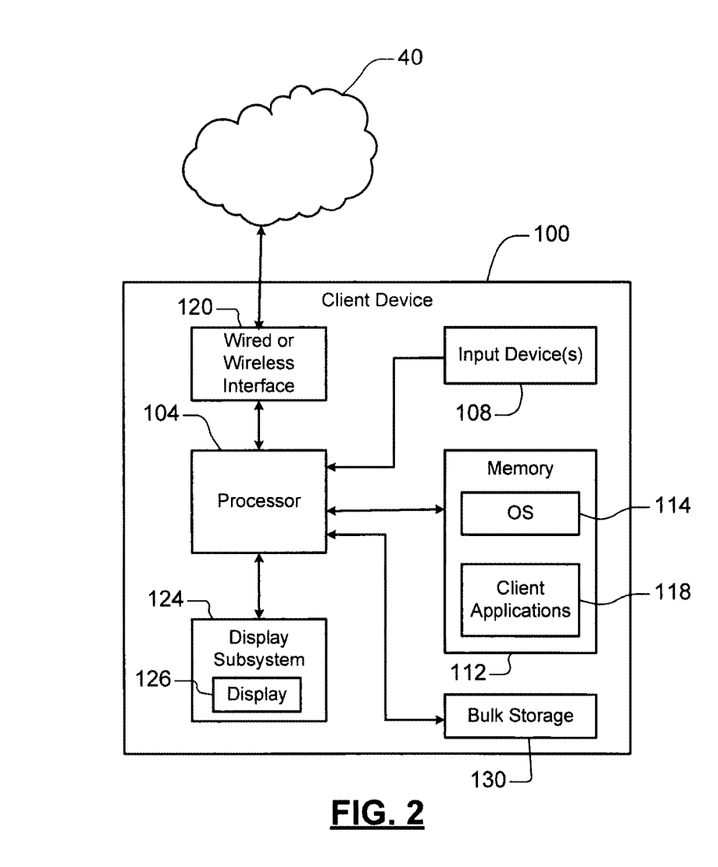
FIG. 2 is a functional block diagram of an example of a client device.
Figure 3:
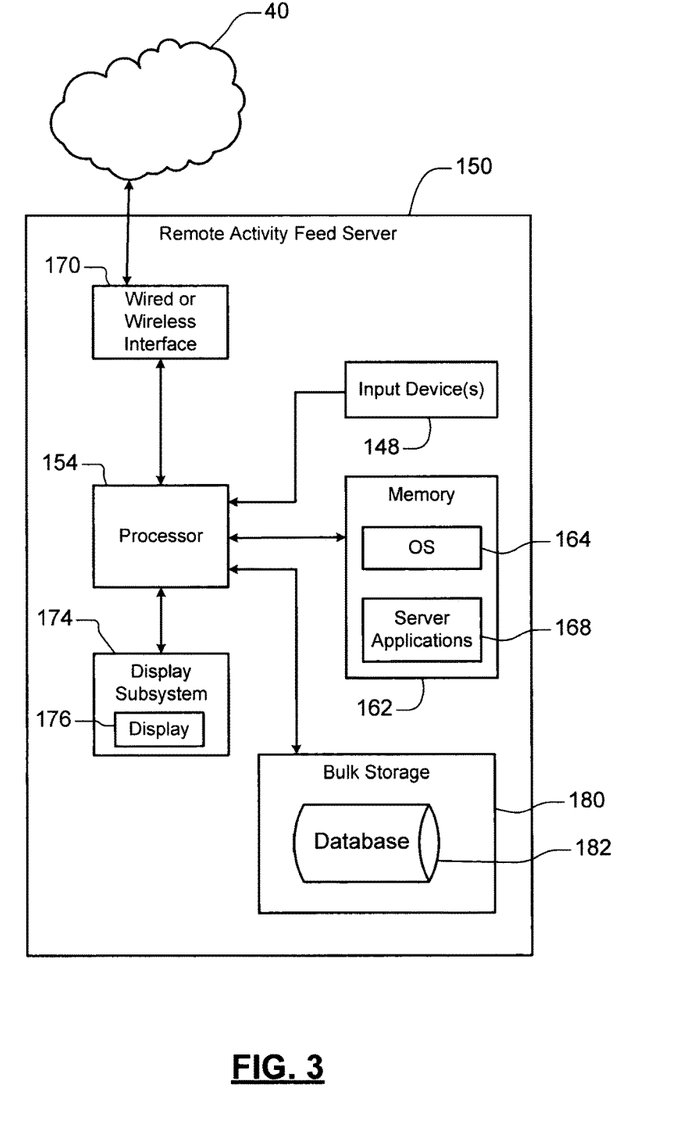
FIG. 3 is a functional block diagram of an example of an activity feed server.

Referring now to FIGS. 1-3, a simplified example of a distributed communications system 40 is shown. The distributed communications system 40 may include a local area network (LAN), a wide area network (WAN) such as the Internet or other type of network. In FIG. 1, one or more client devices 50-1, 50-2, . . . 50-C (collectively client devices 50) (where C is an integer greater than or equal to one) communicate with a remote activity feed server 60 via the distributed communications system 40. The client devices 50 and the activity feed server 60 may have wireless and/or wired connections to the distributed communications system 40.

In FIG. 2, a simplified example of a client device 100 is shown. The client device 100 typically includes a central processing unit (CPU) or processor 104 and an input device 108 such as a keypad, touchpad, mouse, etc. The client device 100 further includes memory 112 such as volatile or nonvolatile memory, cache or other type of memory. The client device further includes bulk storage 120 such as flash memory, a hard disk drive (HDD) or other bulk storage.

The processor 104 of the client device 100 executes an operating system 114 and one or more client applications 118. The client device 100 further includes a wired interface (such as an Ethernet interface) and/or wireless interface (such as a Wi-Fi, Bluetooth, near field communication (NFC) or other wireless interface (collectively identified at 120)) that establish a communication channel over the distributed communication system 40. The client device 100 further includes a display subsystem 124 including a display 126.

In FIG. 3, a simplified example of an activity feed server 150 is shown. The activity feed server 150 typically includes a CPU or processor 154 and an input device 158 such as a keypad, touchpad, mouse, etc. The activity feed server 150 further includes memory 162 such as volatile or nonvolatile memory, cache or other type of memory.

The processor 154 of the activity feed server 150 executes an operating system 164 and one or more activity feed applications 168. The activity feed server 150 further includes a wired or wireless interface 170 that establishes a communication channel over the distributed communication system 40. The activity feed server 150 further includes a display subsystem 174 including a display 176.

The activity feed server 150 further includes bulk storage 180 such as flash memory, a hard disk drive (HDD) or other local or remote storage. In some examples, the bulk storage 180 includes an event database 182 storing the occurrences of events having one or more event types for a plurality of client devices. Alternately, the activity feed server 150 may access another server (not shown) including an event database (not shown) storing the occurrences of events for the client devices. As can be appreciated, while specific configurations are shown, there are a wide variety of ways for implementing the event database with respect to the remote activity feed server 150.

One of the client applications 118 on the client device 100 may be associated with an activity feed that is managed by one of the activity feed server applications 168 on the activity feed server 150. When a user launches the client application 118 associated with the activity feed of the activity feed server 150, the client device 100 generates a request for aggregation of events and the activity feed server 150 generates a response based upon the request.

More particularly, the client application 118 or the user selects two or more local time intervals for event aggregation. The client application 118 sends a request including the local time intervals to the operating system 114 of the client device 100. In some examples, the local time intervals correspond to relative time intervals such as today, yesterday, last week, last month, etc. or more specific time intervals such as May 18, 2015 at 8:14 am until Jan. 21, 2015 at 9:23 pm. The local time intervals such as today are relative in that the time intervals require knowledge of the location of the client device 100. For example, requesting event aggregation for today for the client device 100 when it is located in London will be different than requesting event aggregation for the same client device 100 that is located in New York.

The operating system 114 of the client device 100 converts the local time intervals into coordinated universal time (UTC) and provides the UTC time intervals back to the client application 118. The client application 118 generates a HTTP request for the event aggregations that specifies the corresponding UTC time intervals. In some examples, the HTTP request includes requests for event aggregations for two or more UTC time intervals. In some examples, the body of the HTTP request includes a list of the UTC time intervals (previously calculated by the operating system 114 of the client device 100) for which the event aggregations should be computed. The client device 100 sends the HTTP request to the remote activity feed server 150 over the distributed communications system 40.

Upon receiving the single HTTP request from the client device 100, the remote activity feed server 150 validates the time intervals in the HTTP request. For example, the activity feed server 150 may validate that the time intervals are in a chronological order (oldest to newest or vice-versa).

The remote activity feed server 150 fetches all of the events between the UTC time intervals for the event type to be aggregated for the client device. The activity feed server 150 aggregates the events between the different UTC time intervals that are requested, generates a count, and adds the start and end timestamps and/or other information. If the events in the database are pre-aggregated events (e.g. 30 minute pre-aggregated events), the server creates new aggregated events that result from the aggregation of these pre-aggregated events. If the requested range is not fully described by the pre-aggregated events, individual events may be used in addition to the pre-aggregated events during periods that are not pre aggregated.

The remote activity feed server 150 sends a single response including the event aggregation information for two or more UTC time intervals to the client device 100 over the distributed communications system 40. The client device 100 converts the UTC time intervals into local time intervals and populates an event summary screen on the display.

Figure 4:
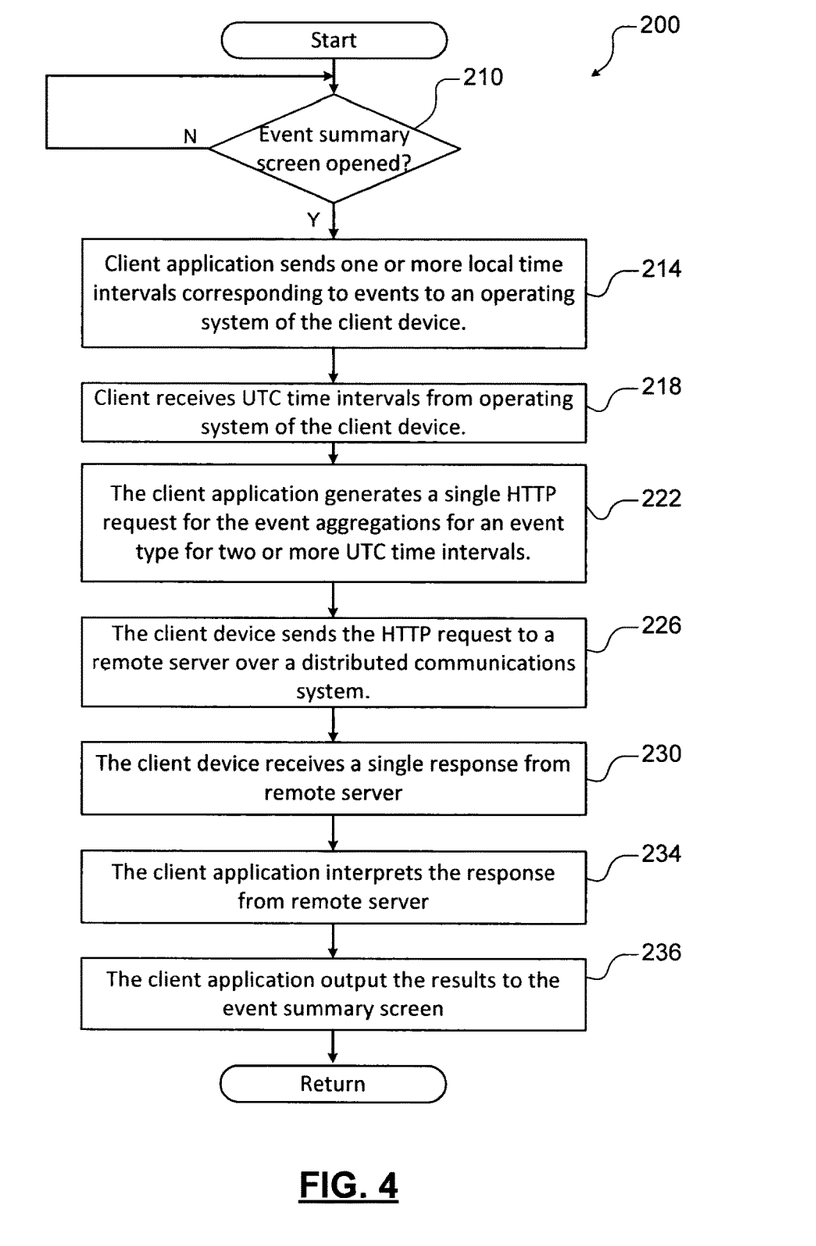
FIG. 4 is a flowchart illustrating an example of a method for generating an event aggregation request at the client device.

Referring now to FIG. 4, a method 200 for generating and event aggregation requests at the client device 100 is shown. At 210, the client device 100 determines whether the event summary screen for the client application 118 is open. Alternately, the event aggregation can be triggered when the client device is turned on, periodically, when the client application is launched, and/or using any other event-driven or time-based criteria.

At 214, the client application 118 sends one or more local time intervals corresponding to an event type to be aggregated by the activity feed server to the operating system 114 of the client device 100. At 218, the client device 100 receives time intervals in UTC format from the operating system 114 of the client device 100. At 222, the client application 118 generates a HTTP request for the event aggregations for the event type for two or more UTC time intervals. At 226, the client device 100 sends the HTTP request to the activity feed server 150 over the distributed communication system 40.

At 230, the client device 100 receives a single response from the remote activity feed server 150. The remote activity feed server 150 generates a single response for multiple requests for event aggregations for two or more different UTC time intervals for the client device. At 234, the client application 118 interprets the response from the remote activity feed server 150. At 236, the client application populates the event summary screen.

For example, the time intervals can be for the same or different days or the same or different time periods (today, yesterday, last week, last month, etc). The time intervals can be overlapping or non-overlapping. The following is an example of a single POST request for three time intervals:

```
{
  "requests":[
    {
      "httpMethod":"GET",
      "relativeUrl":"/providers/Microsoft.ProcessSimple/
events?$filter=Timestamp gt 2016-05-16T08:00:00Z and
Timestamp lt 2016-05-17T08:00:00Z$aggregate=Fail,Success&api-
version=2016-03-01-preview"
    },
    {
      "httpMethod":"GET",
      "relativeUrl":"/providers/Microsoft.ProcessSimple/
events?$filter=Timestamp gt 2016-05-01T08:00:00Z and Timestamp
lt 2016-05-07T08:00:00Z&$aggregate=Fail,Success&api-
version=2016-03-01-preview"
    },
    {
      "httpMethod":"GET",
      "relativeUrl":"/providers/Microsoft.ProcessSimple/
events?$filter=Timestamp gt 2016-05-01T08:00:00Z and Timestamp
lt 2016-05-31T08:00:00Z&$aggregate=Fail,Success&api-
version=2016-03-01-preview"
    }
  ]
}
```

A first portion of the HTTP request shown above relates to aggregation of events occurring on a single day in May. A second portion of the HTTP request relates to aggregation of events occurring during a week starting on the 1$^{st}$ day of May until the 5$^{th}$ day of May. A third portion of the HTTP request relates to aggregation of events for the month of May.

Figure 5:
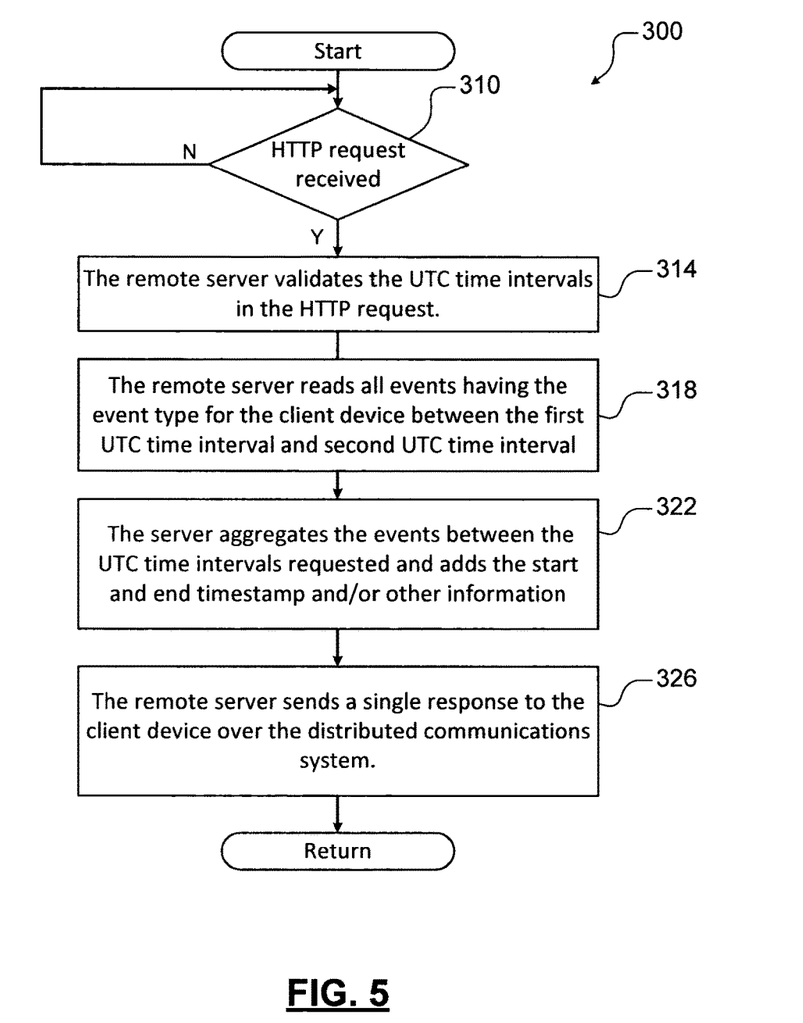
FIG. 5 is a flowchart illustrating an example of a method for generating an event aggregation response at the activity feed server.

Referring now to FIG. 5, a method 300 for generating an event aggregation response at the activity feed server is shown. At 310, the method determines whether a HTTP request is received by the remote activity feed server 150. At 314, the remote activity feed server 150 validates the UTC time intervals in the HTTP request. At 318, the remote activity feed server reads all of the events between the two or more UTC time intervals for the event type and the client device. At 322, the remote activity feed server 150 aggregates the events between the UTC time intervals that are requested. The remote activity feed server 150 adds the start and end timestamps to the response, the count and/or other information to generate an event aggregation response. At 326, the remote activity feed server 150 sends the event aggregation response to the client device 100 over the distributed communication system 40.

Figure 6A:
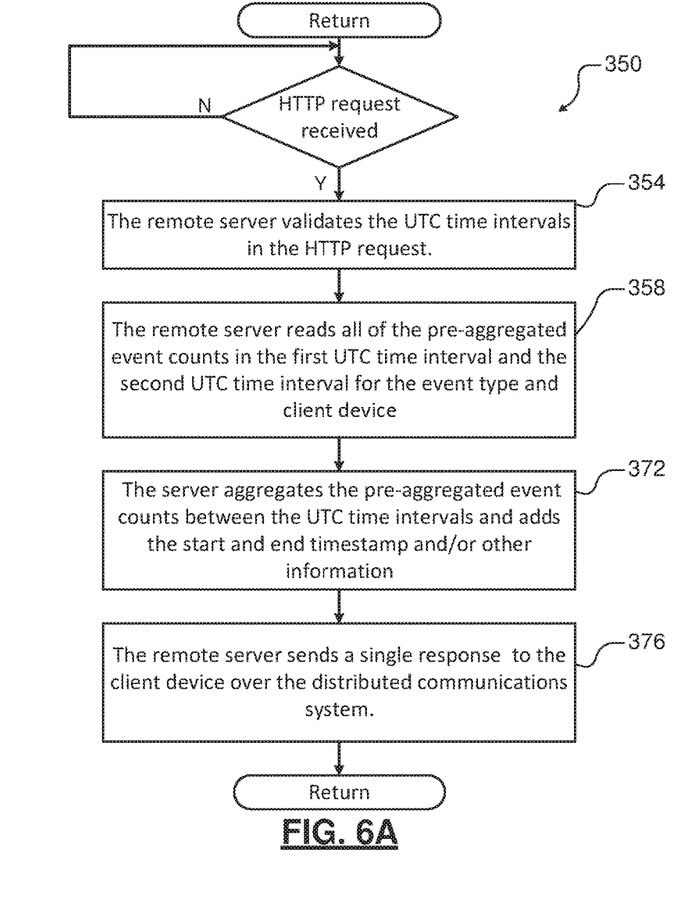
FIGS. 6A and 6B are flowcharts illustrating an example of a method for event pre-aggregation executed by the activity feed server.

An example of an event aggregation response for a request including two UTC time intervals is shown below:

time windows. At 352, the method determines whether a HTTP request is received by the remote activity feed server 150. At 354, the remote activity feed server 150 validates the time intervals in the HTTP request. At 358, the remote activity feed server reads all of the pre-aggregated event counts between the UTC time intervals for the event type and the client device. At 372, the remote activity feed server 150 aggregates or sums the pre-aggregated event counts between the different time intervals that are requested. The remote activity feed server 150 adds the start and end time stamps to the response, the count and/or other information to generate an event aggregation response. At 376, the remote activity feed server 150 sends the event aggregation response to the client device over the distributed communication system.

Figure 6B:
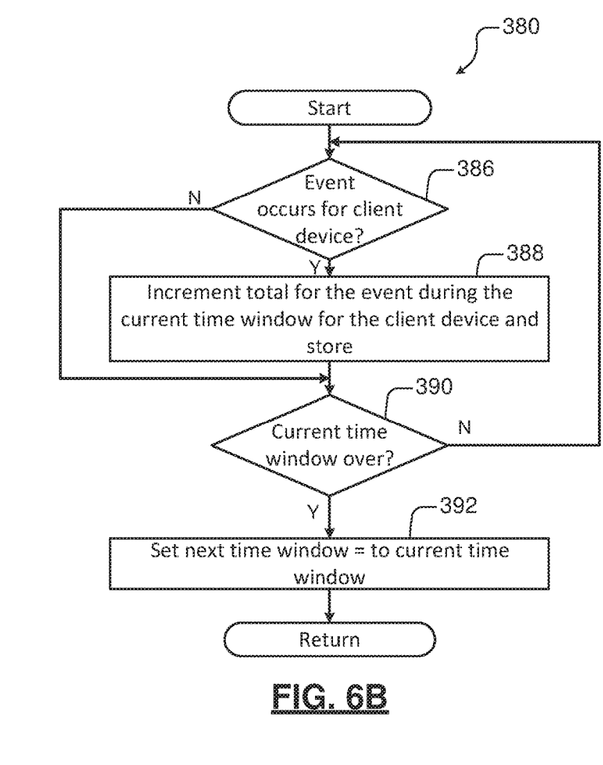

In FIG. 6B, a method 380 for pre-aggregating event counts for the client devices is shown. At 386, the method determines whether an event occurs for one of the client devices. If 386 is false, the method continues at 390. When 386 is true, a count for the event during a current time window is incremented for the corresponding client device. If the current time interval is not over at 390, the method

```
{
    "type":"Microsoft.ProcessSimple/feeds/72F988BF86F141AF91AB2D7CD011DB
47-6C1066FFC4E0414B8CCD9C350B020A96/events",
    "id":"/providers/Microsoft.ProcessSimple/feeds/72F988BF86F141AF91AB2D7C
D011DB47-6C1066FFC4E0414B8CCD9C350B020A96/events/aggregated",
    "properties":{
        "title":"Flowsuccessfullyran1465times",
        "actorId":"f1146746-dd51-4dc4-8fbc-6c565a094dc1",
        "timestamp":"2016-05-17T07:59:13.0507262Z",
        "type":"AggregatedSuccess",
        "object":{
            "fromTimestamp":"2016-05-16T08:00:00+00:00",
            "toTimestamp":"2016-05-17T08:00:00+00:00",
            "count":1465,
            "displayName":"Display name for flow 1",
            "isFlowDeleted":false
        }
    }
}
{
    "type":"Microsoft.ProcessSimple/feeds/72F988BF86F141AF91AB2D7CD011DB
47-6C1066FFC4E0414B8CCD9C350B020A96/events",
    "id":"/providers/Microsoft.ProcessSimple/feeds/72F988BF86F141AF91AB2D7C
D011DB47-6C1066FFC4E0414B8CCD9C350B020A96/events/aggregated",
    "properties":{
        "title":"Flowfailed25times","actorId":"67380f36-b71a-422f-822c-
3361dfdab717",
        "timestamp":"2016-05-17T07:15:16.8500956Z",
        "type":"AggregatedFail",
        "object":{
            "fromTimestamp":"2016-05-16T08:00:00+00:00",
            "toTimestamp":"2016-05-17T08:00:00+00:00",
            "count":25,
            "displayName":"Display name for flow 2",
            "isFlowDeleted":false
        }
    }
}
]
```

In another example, a selected event occurs 10,000 times for the client device on May 5, 2016. The client device sends an HTTP request including a time interval specifying May 5, 2016. Without pre-aggregation, the activity feed server needs to read 10,000 events from the database. With pre-aggregation, the activity feed server 150 reads 48 events (using a 30 minute pre-aggregation time window) in the worst-case scenario (e.g. when May 5, 2016 has ended).

Referring now to FIGS. 6A and 6B, a method 350 for event aggregation using pre-aggregation over successive returns to 386. If the current time window is over at 390, the next time window is set equal to the current window and control returns.

The activity feed server 150 may be configured to pre-aggregate event counts over one or more different predetermined time windows. For example, a first pre-aggregation time window can be set equal to 30 minutes and a second pre-aggregation time interval can be set equal to 1 day. For example, a time interval from corresponding to last week can be created by aggregating 7 full day pre-aggregations as compared to 7*48=336 reads if 30 minute pre-aggregations are used. The 30 minute pre-aggregations can be used for requests corresponding to subsets of a day such as this morning or yesterday morning.

In some examples, the pre-aggregation time window may be selected for all client devices or may be adjusted for individual client devices based on their requests. For example, the pre-aggregation time window may be selected to be 30 minutes for one client device based on a trend including a plurality of prior partial-day requests from the client device and 1 day for another client device based on a trend including a plurality of prior full day requests from the client device.

Figure 7:
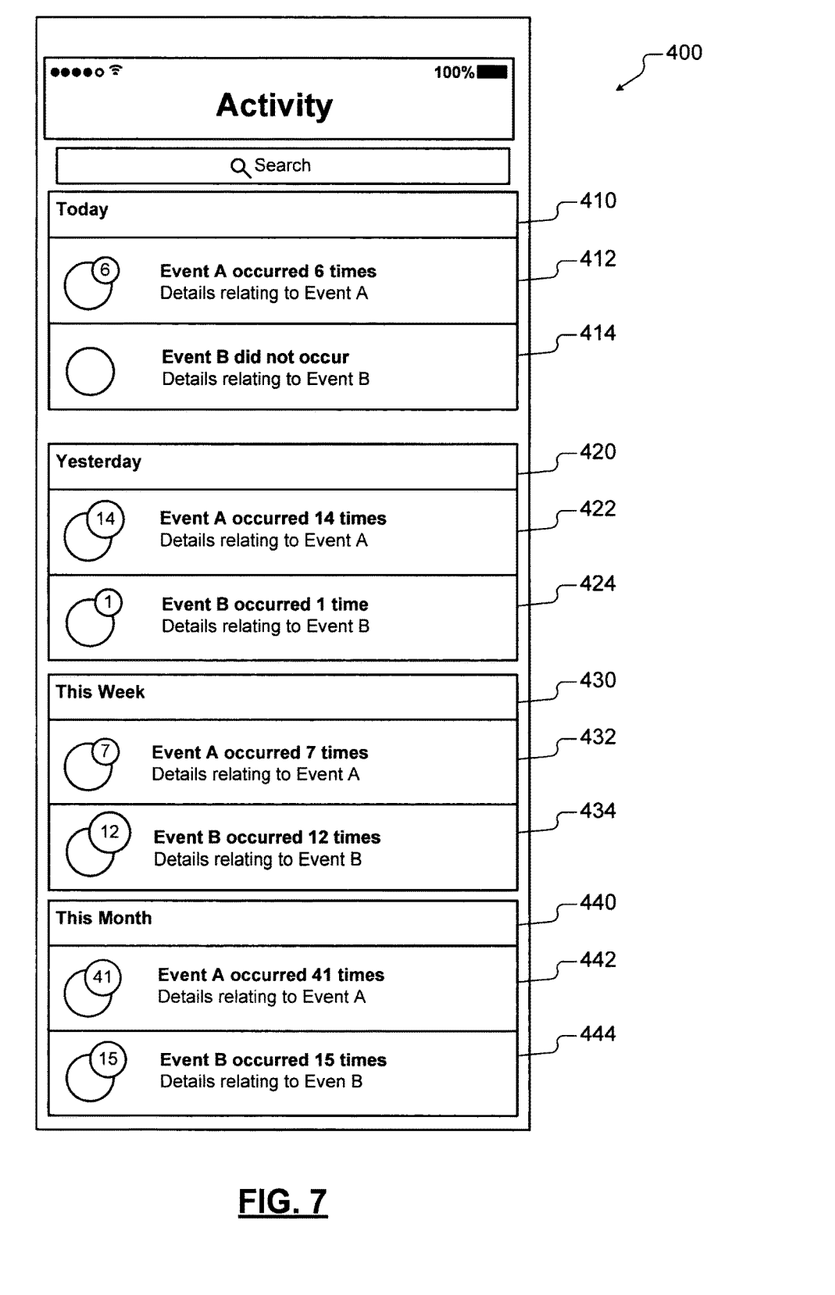
FIG. 7 illustrates an example of an event summary screen on the client device for displaying event aggregation results.

Referring now to FIG. 7, an example of an event summary screen 400 associated with the client application 118 on the client device 100 displays event aggregation results. A first portion 410 corresponds to the event activity for today and includes event results 412 and 414. A second portion 420 of the event summary screen 400 corresponds to event activity for yesterday and includes event results 422 and 424. A third portion 430 of the event summary screen 400 corresponds to event activity this week and includes event results 432 and 434. A fourth portion 440 of the event summary screen 400 corresponds to event activity this month and includes event results 442 and 444. In some examples, the results 412, 422, 432 and 442 may relate to a first event type and the results 414, 424, 434 and 444 relate to a second event type.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (BON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTMLS, Ada, ASP (active activity feed server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A client device comprising:
a processor and memory;
an operating system executed by the processor and memory;
a network interface; and
a client application that is executed by the processor and memory and that is configured to:
convert a first time interval in local format and associated with a first event type and a second time interval in the local format and associated with the first event type into first and second time intervals in a standard global time zone format;
generate a hypertext transfer protocol (HTTP) request for the remote server to aggregate corresponding events of the first and second time intervals, the HTTP request comprising the first time interval and the second time interval specified in the standard global time zone format; and
transmit the HTTP request via the network interface to the remote server.

2. The client device of claim 1, wherein the client application is further configured to receive an HTTP response from the remote server corresponding to the HTTP request.

3. The client device of claim 1, wherein the client application determines the standard global time zone format for the first and second time intervals by:
sending a request to the operating system of the client device including the first time interval in the local format and the second time interval in the local format; and
receiving a response from the operating system of the client device which specifies the first and second time intervals in the standard global time zone format.

4. The client device of claim 1, wherein the first time interval corresponds to a relative time period that is dependent upon a geographic location of the client device.

5. The client device of claim 2, wherein the client application interprets the HTTP response and updates an event summary screen of the client application based thereon.

6. The client device of claim 2, wherein the client application interprets the HTTP response and updates an event summary screen of the client application by updating a first count corresponding to the first time interval of the first event type and updating a second count corresponding to the second time interval of the first event type.

7. The client device of claim 1, wherein the first time interval overlaps the second time interval.

8. The client device of claim 1, wherein the first time interval has a different duration than the second time interval.

9. The client device of claim 1, wherein the first time interval does not overlap the second time interval.

10. The client device of claim 1, wherein the first time interval has the same duration as the second time interval.

11. A server for aggregating events for remote client devices, comprising:
   a processor and memory;
   a network interface;
   an event database; and
   an activity feed application that is executed by the processor and memory and that is configured to:
      receive a hypertext transfer protocol (HTTP) request from a client device via the network interface, wherein the HTTP request includes a first time interval associated with a first event type and a second time interval associated with the first event type, and the first and second time intervals are converted by the client device from a local time zone format into a standard global time zone format;
      aggregate corresponding events of the first event type in the event database for the client device based on the first and second time intervals in the standard global time zone format; and
      generate and transmit a HTTP response to the client device based on the event aggregation at the event database.

12. The server of claim 11, wherein the server is further configured to transmit the single response to the client device via the network interface.

13. A server for aggregating events for remote client devices, comprising:
   a processor and memory;
   a network interface;
   an event database; and
   an activity feed application that is executed by the processor and memory and that is configured to:
      pre-aggregate events for a plurality of client devices by event type during time windows to generate pre-aggregated event counts;
      receive a hypertext transfer protocol (HTTP) request from one of the client devices via the network interface including a first time interval associated with a first event type and a second time interval associated with the first event type, wherein the first and second time intervals are converted by the client device from a local time zone format into a standard global time zone format;
      generate a first count and a second count by aggregating corresponding pre-aggregated event counts during the first time interval for the first event type and the second time interval for the first event type, respectively; and
      generate and transmit a HTTP response for the client device including the first count and the second count.

14. The server of claim 13, wherein the server is further configured to transmit the single response to the client device via the network interface.

15. The client device of claim 1, wherein the client application converts the first and second time intervals from local current time format into uniform coordinated time (UTC) format.

16. The client device of claim 1, wherein the client application includes the first time interval in the standard global time zone format into a first uniform resource locator (URL) in the HTTP request, and includes the second time interval in the standard global time zone format into a second URL in the HTTP request.

17. The client device of claim 1, wherein the client application includes the first and second time intervals specified in the standard global time zone format within a HTTP POST request.

* * * * *